US006487542B2

(12) United States Patent
Ebata et al.

(10) Patent No.: US 6,487,542 B2
(45) Date of Patent: Nov. 26, 2002

(54) METHOD AND APPARATUS FOR MANAGING ELECTRONIC MONEY AND STORAGE FOR STORING AN ELECTRONIC MONEY MANAGEMENT PROGRAM

(75) Inventors: Tomoichi Ebata, Kawasaki (JP); Hiromichi Ito, Yokohama (JP); Masato Saito, Yokohama (JP); Yoshihiro Kamata, Yokohama (JP); Hiroshi Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/132,770

(22) Filed: Aug. 12, 1998

(65) Prior Publication Data

US 2002/0095370 A1 Jul. 18, 2002

(30) Foreign Application Priority Data

Aug. 14, 1997 (JP) .............................. 9-219408

(51) Int. Cl.$^7$ .............................................. G06F 17/60
(52) U.S. Cl. .............................. 705/69; 705/50; 705/51; 705/64; 705/67; 705/71; 705/75; 705/80
(58) Field of Search ............................. 705/21, 39, 41, 705/42, 64, 68, 69, 70, 35; 235/375, 380, 381, 379, 487

(56) References Cited

U.S. PATENT DOCUMENTS

| | | | | |
|---|---|---|---|---|
| 5,586,937 A | * | 12/1996 | Menashe | 463/41 |
| 5,644,721 A | * | 7/1997 | Chung et al. | 395/206 |
| 5,787,402 A | * | 7/1998 | Potter et al. | 705/37 |
| 5,799,087 A | * | 8/1998 | Rosen | 705/69 |
| 5,884,274 A | * | 3/1999 | Walker et al. | 705/4 |
| 5,897,621 A | * | 4/1999 | Boesch et al. | 705/26 |
| 5,902,983 A | * | 5/1999 | Crevelt et al. | 235/380 |
| 5,905,976 A | * | 5/1999 | Mjolsnes et al. | 705/39 |
| 5,952,639 A | * | 9/1999 | Ohki et al. | 235/379 |
| 6,003,765 A | * | 12/1999 | Okamoto | 235/379 |
| 6,023,508 A | * | 2/2000 | Bombard et al. | 380/24 |
| 6,044,360 A | * | 3/2000 | Picciallo | 705/21 |

FOREIGN PATENT DOCUMENTS

JP  09237299 A  *  9/1997  ............. G06F/3/02

OTHER PUBLICATIONS

David Stewart, "Picking winners and Losers in digital cash", Bank TEchnology News, v10, n10, p 15, Oct. 1997.*
A. Dahl and L. Lensnick, "Internet Commerce", New Riders Publishing, pp. 85–120.

* cited by examiner

Primary Examiner—Hyung-Sub Sough
Assistant Examiner—Calvin L Hewitt, II
(74) Attorney, Agent, or Firm—Antonelli, Terry, Stout & Kraus, LLP

(57) ABSTRACT

According to the present invention, when electronic money is sent from a given network to another network, a money change apparatus performs a money change process to change electronic money current on the given network into electronic money current on another network, and therefore when a user of the given network uses a settling process, by managing this money change process, it is possible to manage the interchange of electronic money between each of the users of the given network and each of the users of another network without affecting the working environment of electronic commerce. Electronic money current on LAN20 is referred to as local electronic money current only on the network. When a terminal NLU4 connected to LAN20 sends money to a terminal NWU2 connected to WAN10, GW1 for controlling the flow of data between LAN20 and WAN10 receives local electronic money sent from the terminal NLU4, changes the local electronic money into electronic money current on WAN10, then sends the electronic money to the terminal NWU2, and when a terminal NWU2 sends money to a terminal NLU4, GW1 receives electronic money sent from the terminal NWU2, changes the electronic money into local electronic money and sends the local electronic money to the terminal NLU4.

13 Claims, 13 Drawing Sheets

FIG. 4A

| ACCEPTANCE NO. | PROCESSING DATE, TIME | SENDER | RECIPIENT | MONEY RECEIVED | BANK NAME | AUTHENTI-CATION RESULT |
|---|---|---|---|---|---|---|
| 184 | 1997/2/14 15:34:56 | USER NAME @NWU2a | USER NAME @NLU4a | ¥98,800 | NB3a | Success |
| 185 | 1997/2/14 16:43:32 | USER NAME @NWU2b | USER NAME @NLU4b | ¥103,400 | NB3b | Failure |

FIG. 4B

| ACCEPTANCE NO. | INDEX NO. | PROCESSING DATE, TIME | SENDER | RECIPIENT | MONEY RECEIVED | MONEY CHG. SERVER | REMITTANCE RESULT |
|---|---|---|---|---|---|---|---|
| 256 | 181 | 1997/2/14 14:23:34 | USER NAME @NWU2a | USER NAME @NLU4a | ¥8,800 | GW1 | Success |
| 257 | 184 | 1997/2/14 15:35:29 | USER NAME @NWU2b | USER NAME @NLU4b | ¥103,400 | GW1 | Success |

FIG. 4C

| ACCEPTANCE NO. | INDEX NO. | PROCESSING DATE, TIME | SENDER | RECIPIENT | MONEY RECEIVED | MONEY CHG. SERVER | ERASURE RESULT |
|---|---|---|---|---|---|---|---|
| 97 | 223 | 1997/3/14 10:21:32 | USER NAME @NWU2a | USER NAME @NLU4a | ¥88,800 | GW1 | Success |
| 98 | 257 | 1997/3/14 23:32:21 | USER NAME @NWU2b | USER NAME @NLU4b | ¥10,400 | GW1 | Success |

FIG. 4D

| ACCEPTANCE NO. | INDEX NO. | PROCESSING DATE, TIME | SENDER | RECIPIENT | MONEY RECEIVED | BANK NAME | REMITTANCE RESULT |
|---|---|---|---|---|---|---|---|
| 32 | 90 | 1997/3/14 10:22:43 | USER NAME @NWU2a | USER NAME @NLU4a | ¥907,800 | NB3a | Success |
| 33 | 98 | 1997/3/14 23:33:25 | USER NAME @NWU2b | USER NAME @NLU4b | ¥10,400 | NB3b | Failure |

FIG. 5

```
Value:¥788,000
Serial:1679863543
Generator:NB3
Signature:NB3
——BIGIN DIGITAL SIGNATURE ——
q9ivaqp49-00gtlauihoside0aogae@
——END DIGITAL SIGNATURE ——
```

FIG. 6

```
Value:¥788,000
Serial:00001423
From:user name@NWU2a. co.jp
To:user name @ NLU4b. co.jp
Generator:GW1
Signature:GW1
——BIGIN DIGITAL SIGNATURE ——
ajafjdhgidioaufaijfisdfjahijfa
——END DIGITAL SIGNATURE ——
```

```
Value:¥788.000
Serial:00001423
From:user name @NWU2a. co. jp
To:user name @NLU4b. co. jp
Generator:GW1
Signature:GW1
——— BEGIN DIGITAL SIGNATURE ———
ajafjdhgidioaufaijflsdfjahlifa
——— END DIGITAL SIGNATURE ———
Signature:user name @NLU4b
——— BEGIN DIGITAL SIGNATURE ———
.1 th8ptoigjklao;obj9utq3oirgasj
——— END DIGITAL SIGNATURE ———
```

FIG. 12

```
Value:¥253,000
Serial:256
```
— 701

```
Value:¥657,000
Serial:303
```
— 702

```
Value:¥298,000
Serial:386
```
— 703

```
BIGIN SCRIPT
@sum(256,303,386)
@div(¥1,000,000:user name @ NLU4b)
@bil(:ME)
END SCRIPT
Signature:user name @NLU4a
— BEGIN DIGITAL SIGNATURE —
    aihgadfighalh;oiq6ot9qerag
— END DIGITAL SIGNATURE —
```
— 704

FIG. 13

```
Value:¥1,000,000
Serial:653
```

```
Value:¥208,000
Serial:654
```

FIG. 14

| USER | MAXIMUM REMITTANCE | RECEIVER ADDRESS |
|---|---|---|
| user1 | ¥1,000,000 | all |
| user2 | ¥500,000 | receiver @ nomura.co.jp |
| President | No limit | all |

FIG. 16

```
Value:¥1,000,000                    ──711
Serial:653

BEGIN SCRIPT
@message 35429
@comment
THIS IS TO REQUEST THAT APPROVAL
BE GIVEN TO MY MAKING A REMITTANCE  ──712
AS PER SETTLEMENT NO.35429
END SCRIPT
Signature:user4
— BEGIN DIGITAL SIGNATURE —
aihgadfjghalh:oiq6ot9qerag
— END DIGITAL SIGNATURE —
```

FIG. 17

```
Value:¥1,000,000                    ──711
Serial:653

BEGIN SCRIPT
@message 35429
@comment

THIS IS TO REQUEST THAT APPROVAL
BE GIVEN TO MY MAKING A REMITTANCE  ──712
AS PER SETTLEMENT NO.35429
END SCRIPT
Signature:user4
— BEGIN DIGITAL SIGNATURE —
aihgadfjghalh:oiq6ot9qerag
— END DIGITAL SIGNATURE —

BEGIN SCRIPT
@message accepted
@comment
 APPROVE
END SCRIPT                          ──713

Signature:President
— BEGIN DIGITAL SIGNATURE—
qu9q3uq4p849qu5tioaifaohtj
— END DIGITAL SIGNATURE—
```

METHOD AND APPARATUS FOR MANAGING ELECTRONIC MONEY AND STORAGE FOR STORING AN ELECTRONIC MONEY MANAGEMENT PROGRAM

BACKGROUND OF THE INVENTION

1. Field of the Invention

The present invention relates to technology for managing electronic money that circulates on networks, such as the Internet.

2. Description of Related Art

Electronic commerce (EC) on networks such as the Internet is now spreading widely. Under the circumstances, technology has been proposed for settling accounts in electronic commerce on a network. This technology is called electronic settlement. Some systems and protocols proposed so far are listed in the following.

(1) First Virtual

An electronic settlement system proposed by First Virtual. Credit card settlement is used. It is a precondition that only digital information goods transferable on a network are dealt with. Electronic mail is used to give and accept orders, but facsimile is used to transmit card numbers for security reasons.

(2) CyberCash

An electronic settlement system proposed by CyberCash. Credit card settlement is used. In addition to giving and accepting orders, networks such as the Internet are used to transmit information about card numbers or the like, which need to be safeguarded. Therefore, a powerful encryption process is performed on those items of information before transmission to ensure security.

(3) SET (Secure Electronic Transaction)

This is an electronic settlement protocol, proposed by Visa International, Master Card International, etc. Credit card settlement is used. As in CyberCash, a strong encryption process is conducted on information about giving and accepting orders and card numbers or the like before transmission.

Furthermore, SET provides means for authenticating credit card users and means for authenticating member stores where the credit cards can be used.

(4) Ecash

Ecash is an electronic settlement system proposed by DigiCash and uses the electronic money digital cash system. More specifically, cash settlement is made by electronic money having a value equal to an actual paper currency. The user draws electronic money corresponding to the sum of payment from the storage medium, and sends the money to the recipient.

The above examples (1) to (3) are applications of settlement by credit card to settlement in electronic commerce. Therefore, credit cards are required to settle accounts. Information about a card number or the like, which needs to be protected, must be sent in one form or another. Moreover, the flow of money (who spent how much, and where) is known to a third party, in other words, it shows low anonymity.

In contrast to these, ecash in (4) applies cash settlement by bills and coins for settlement in electronic commerce. Unlike (1) to (3) above, credit cards are not required. Like in cash settlement by bills or coins, it is difficult for a third party to detect the flow of money (strong anonymity).

As has been described, ecash is highly convenient because it does not use credit cards as a means of settlement. Technology, like ecash, which realizes settlement on a network by electronic money, is generally called network type electronic money. Unless otherwise defined, the network type electronic money is hereafter referred to simply as electronic money.

SUMMARY OF THE INVENTION

As described in RELATED ART above, there are a variety of kinds of electronic money. It can easily be foreseen that many other kinds of electronic money will appear and circulate intermingling on the networks in the future. At present, however, electronic commerce is impossible between the users of different kinds of electronic money, a fact which greatly reduces the effectiveness of electronic settlement.

With the progress of electronic money, it will become possible for individual persons to easily remit large sums of money across the boundaries of countries. Under such a situation, there are possibilities for the management of currency transfer from one country to another to get out of control, which easily gives rise to financial insecurity, such as inflation or deflation on an international scale.

As described above, electronic money is characterized by its strong protection of anonymity of the user. However, in the case of the conventional ecash described above, when members of organizations, such as business firms, use electronic money, owing to its characteristic, it is anticipated that problems will arise which would not be so troublesome when individual persons use electronic money. To cite some examples, (1) When a member of an organization settles an account with a user outside the organization by using electronic money, the administrative department (e.g., the accounting or materials department) of the organization is unable to manage the settlement of the account.

(2) Since it becomes possible to send remittance outside the organization easily by the use of electronic money, the amount of damage may run up to an alarming sum in the case of a remittance error, embezzlement or fraud.

With the conventional form of ecash, if a payment is made by electronic money on hand, a sum of payment is collected as a combination of different nominal values of electronic money and the money is sent. For this reason, the user must always be cognizant of the numbers of different pieces of electronic money of different nominal values that he possesses.

The present invention has been made with the above problems taken into consideration, and has its object to enable management of the transfer of electronic money without affecting the working environment of electronic commerce when settlement systems for different kinds of electronic money are used.

To solve the above problems, the present invention provides a method of managing electronic money in a network apparatus installed between a first network and a second network, wherein electronic money circulating only within the first network is designated as electronic money current on the first network (This electronic money is hereafter referred to as electronic money A), the method comprising the steps of:

when a first terminal connected to the first network sends money to a second terminal connected to the second network, receiving electronic money A sent from the first terminal, changing the electronic money A into electronic money current on the second network (The latter electronic money is hereafter referred to as electronic money B), and sending electronic money B to said second terminal; and when the second terminal sends money to the first terminal, receiving electronic money B sent from the second terminal, changing the electronic money B into electronic money A, and sending electronic money A to the first terminal.

In the above case, the network apparatus is a gateway or a router, for example.

In the present invention, electronic money that can be handled by the first terminal connected to a certain network is assumed to be electronic money A current in that network, in other words, electronic money A is assumed to be a different kind of electronic money from electronic money B current on another network. According to the present invention, a network apparatus connected both to one network and another network is charged with performing a money change function between electronic money A and electronic money B. By this arrangement, the money change process is always performed by the network apparatus during the settlement process when electronic commerce is performed between the first and the second terminals.

Therefore, according to the present invention, when a user of the first terminal connected to a certain network conducts electronic commerce with a user of the second terminal connected to the other network, the network apparatus invariably performs the money change process between electronic money A and electronic money B to settle accounts. Accordingly, the organization (the administrative department, namely, the accounting or materials department) that manages the users connected to that certain network can manage the settlement of accounts between the user at the first terminal connected to the certain network and the user at the second terminal connected to the other network by, for example, recording a history of the money change process at the network apparatus and monitoring the records. As a result, it is possible to minimize trouble in electronic commerce, such as errors in remittance or embezzlement.

Local electronic money can be transferred directly between the users of the terminals connected to a certain network without intervention of the network apparatus, so that anonymity as the advantage in payment by electronic money can be maintained.

In the present invention, when the first terminal sends money to the second terminal, if the nominal value of electronic money A sent from the first terminal is larger than the amount of money previously allotted to the user at the first terminal, the money change process may be designed such that electronic money A is sent back to the first terminal without being converted into electronic money B.

By this arrangement, in electronic commerce between the user at the first terminal connected to the certain network and the user at the second terminal connected to the other network, trouble in electronic commerce, such as an error in remittance or embezzlement, can be further minimized efficiently.

Further, in the present invention, the network apparatus may be so arranged as to change electronic money A sent from the first terminal into a desired combination of different nominal values of electronic money A in response to a command from the first terminal.

In this case, the user at the first terminal can get a desired amount of electronic money A generated even if he is not aware of the quantities of different nominal values of electronic money A that he possesses.

BRIEF DESCRIPTION OF THE DRAWINGS

FIG. 4 is a diagram showing an example of the content of each log file in FIG. 3; FIG. 4A shows an example of an electronic money receipt log 1171; FIG. 4B shows an example of a local electronic money generation/sending log 1172; FIG. 4C shows an example of a local electronic money collection/deletion log 1173; and FIG. 4D shows an example of an electronic money payment log 1174;

FIG. 5 is an example of a format of electronic money issued by terminal NB3;

FIG. 6 is an example of a format of electronic money a generated by a local electronic money generator 113 in FIG. 2;

FIG. 12 is a diagram showing an example of a message sent from terminal NLU4 on the sender side to terminal GW1 in the first modification of the embodiment of the present invention;

FIG. 13 is a diagram showing local electronic money paid into a moneybox 1151 of the remittance destination as directed by the message shown in FIG. 12;

FIG. 14 is a diagram showing an example of the content stored in a permission file 1152;

FIG. 16 is a diagram showing an example of local electronic money accompanied by a message asking for authority to remit in the second modification of the embodiment of the present invention; and FIG. 17 is a diagram showing an example of local electronic money accompanied by an authority transfer message in the second modification of the embodiment of the present invention.

DETAILED DESCRIPTION OF THE PREFERRED EMBODIMENTS

A preferred embodiment of the present invention will be described in the following.

Figure 1:
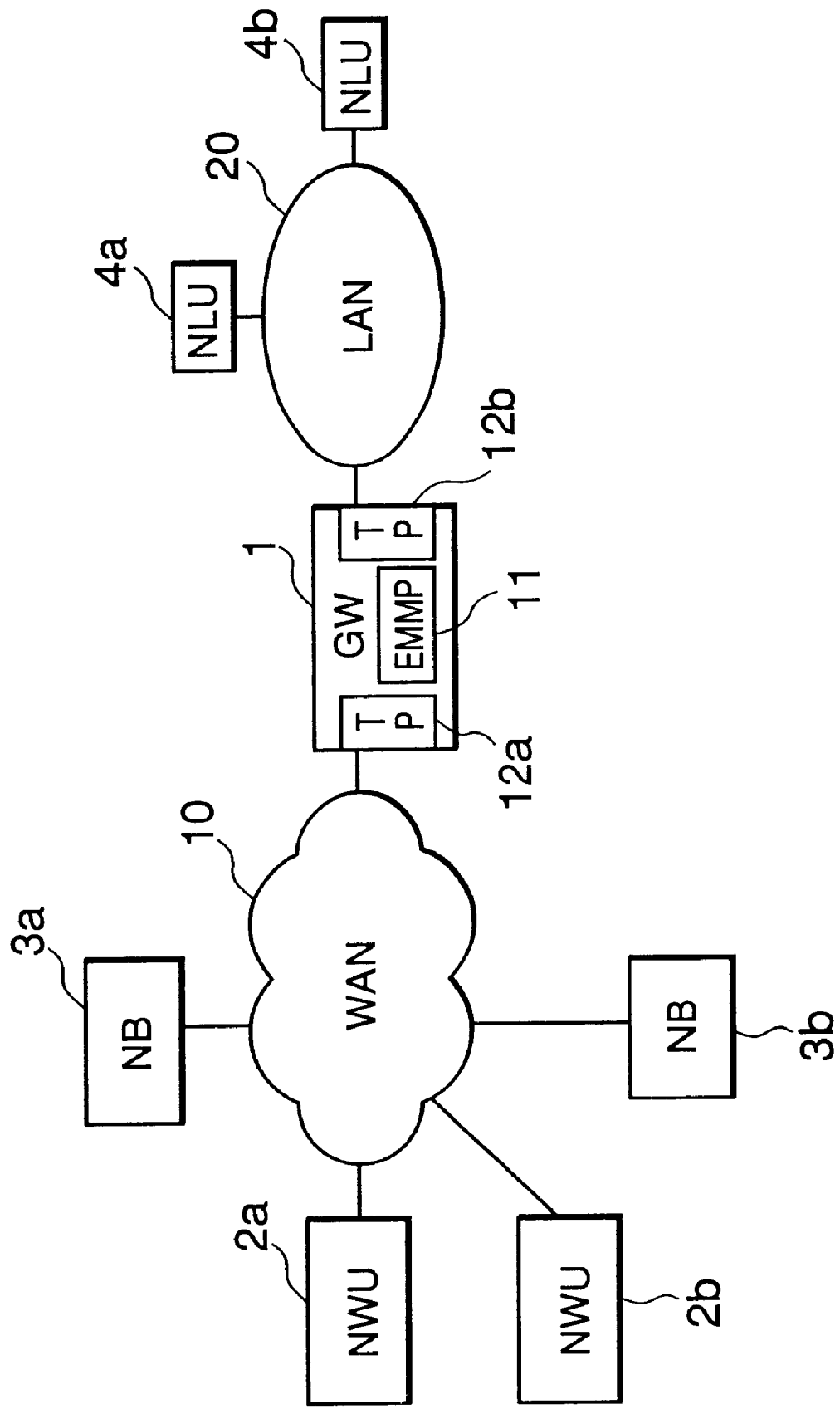
FIG. 1 is a schematic configuration diagram of a network apparatus to which an embodiment of the present invention is applied.

FIG. 1 is a schematic configuration diagram of the network apparatus to which a preferred embodiment of the present invention is applied.

WAN10 denotes a Wide Area Network, LAN20 denotes a Local Area Network, and GW1 denotes a gateway located between WAN10 and LAN20. NB's 3a, 3b are terminals of a bank issuing electronic money, and are connected to WAN10 (hereafter NB's 3a, 3b are referred to merely as NB3). NMU's 2a, 2b and NLU's 4a, 4b are terminals of the users of an accounts settling system by electronic money. NWU's 2a, 2b (hereafter referred to also as NWU2) are connected to WAN10, while NLU's 4a, 4b (hereafter referred to also as NLU4) are connected to LAN20. In this embodiment, terminals NLU4 connected to LAN20 are assumed to be terminals used by users of an organization (a business firm, for example), and terminals NWU2 connected to WAN10 are assumed to be terminals used by users outside the organization. In other words, LAN20 is formed within an organization.

In this embodiment, electronic money that can be handled by the terminals NLU4 connected to LAN20 is limited to electronic money that is current only within LAN20, namely, a kind of electronic money that is different from electronic money issued by the terminal NB3 (hereafter electronic money current only within LAN20 is referred to as local electronic money, while electronic money issued by the terminal NB3 is referred to simply as electronic money.) In this embodiment, GW1 is charged with performing a money change function between electronic money and local electronic money.

Under this arrangement, in an electronic transaction conducted between the terminals NLU4a and NLU4b connected to LAN20, payment is made directly by local electronic money. Furthermore, in an electronic transaction between a terminal NLU4 connected to LAN20 and a terminal NWU2 connected to WAN10, a money change process is invariably carried out at GW1.

More specifically, when money is remitted from a terminal NLU4 to a terminal NWU2, GW1 intercepts local electronic money sent from the terminal NLU4, changes the local electronic money into the corresponding amount of electronic money, and sends it to the terminal NWU2. On the other hand, when a terminal NWU2 remits money to a terminal NLU4, GW1 intercepts electronic money sent from the terminal NWU2 and changes the electronic money into the corresponding amount of local electronic money. GW1 then sends the local electronic money to the terminal NLU4.

Therefore, in this embodiment, when a member of an organization conducts electronic commerce with a user outside the organization, a money change process is always performed at GW1 between electronic money and local electronic money. For this reason, the administrative department (accounting or materials) of the organization can manage the settling process between a member of the organization and a user outside the organization by monitoring the money change process at GW1. Because of this, it is possible to minimize damage caused by remittance errors, embezzlement, or the like.

Local electronic money can be transferred directly between the members of the organization without intervention by GW1, so that anonymity as the advantage in settling accounts by electronic money can be maintained.

A detailed description will now be given of the components of the network apparatus to which this preferred embodiment is applied.

The terminals NB3 of the bank that issues electronic money will first be discussed. It is assumed that a user at a terminal NWU2 has had an account opened and an organization in which LAN20 has been established has had its account opened at this bank.

Each of the terminals NB3 withdraws cash from the customer's account and changes cash into electronic money, or changes electronic money into cash and deposits cash in the customer's account.

More specifically, in response to a command sent from the terminal NWU2 through WAN10, the terminal NB3 withdraws cash from the account of the user at the terminal NWU2, changes cash into electronic money, and sends electronic money through WAN10 to the terminal NWU2. Also, the terminal NB3 changes electronic money sent through WAN10 from the terminal NWU2 into cash, and deposits cash into the account of the user at the terminal NWU2.

Similarly, in response to a command sent through WAN10 from GW1, NB3 withdraws cash from the account of the organization in which LAN20 is set up, changes cash into electronic money, and sends it through WAN10 to GW1. Furthermore, NB3 changes electronic money remitted through WAN10 from GW1 into cash, and deposits it into the account of the organization having LAN20 formed therein.

In addition, the terminal NB3 performs a certification process for electronic money sent and an authentication process on electronic money received.

The terminal NB3 is basically the same as a terminal of a bank used for the electronic money digital cash system including ecash that has been described in the RELATED ART above. The terminal NB3 can be realized by a CPU executing a program loaded in memory from a recording medium, such as a magnetic disk in an information processing apparatus including a function of transferring electronic money on a network.

Description will next be given of the terminal NWU2 operated by a user not belonging to the organization including LAN20.

The NWU2 calls on a terminal NB3 to withdraw cash from a designated account and change it into electronic money, or sends electronic money to the terminal NB3, and directs it to change to cash and deposit the cash into a designated account.

The terminal NWU2 is basically the same as a user's terminal which is used for utilizing the electronic money digital cash system, such as ecash described in the RELATED ART above. The terminal NWU2 can be realized by a CPU executing a predetermined program loaded in memory from a recording medium, such as a magnetic disk, in an information processing apparatus including a function of transferring electronic money on a network.

Description will next be given of the terminal NLU4 used by a member of an organization incorporating LAN20.

The NLU4 is basically the same as the terminal NWU2. It should be noted that electronic money that can be handled by the terminal NWU2 is electronic money issued by the terminal NB3, while electronic money that can be handled by the NWU2 is local electronic money current only within LAN20.

As mentioned earlier, GW1 performs a money change process between local electronic money and electronic money, for which reason the terminal NLU4 can execute settlement processes with the other parties to electronic commerce without worrying about whether the other party is at a terminal of LAN20 or WAN10.

Description will now be given of GW1 which performs the money change process between local electronic money and electronic money.

GW1 has a function of controlling data transmitted between WAN10 and LAN20. This function is realized by a transport programs TP12a and 12b loaded into memory by CPU from a recording medium, such as a magnetic disk, in an information processing apparatus incorporating a function of communication on a network as shown in FIG. 1. The TP12a relays data and messages exchanged with the terminals of WAN10 to a specified program (EMMP11, for example, which will be described later). On the other hand, TP12B relays data and messages exchanged with the terminals of LAN20 to a specified program (EMMP11, described later). These functions are the same as those in an ordinary gateway.

In addition to these functions, GW1 in this embodiment further includes a function of controlling electronic money held by the organization using LAN20 (including the money change process between local electronic money and electronic money). This function is realized by a CPU executing an electronic money management program EMMP11 loaded into memory from a recording medium, such as a magnetic disk, in an information processing apparatus having a function of communication on a network as illustrated in FIG. 1.

Figure 2:
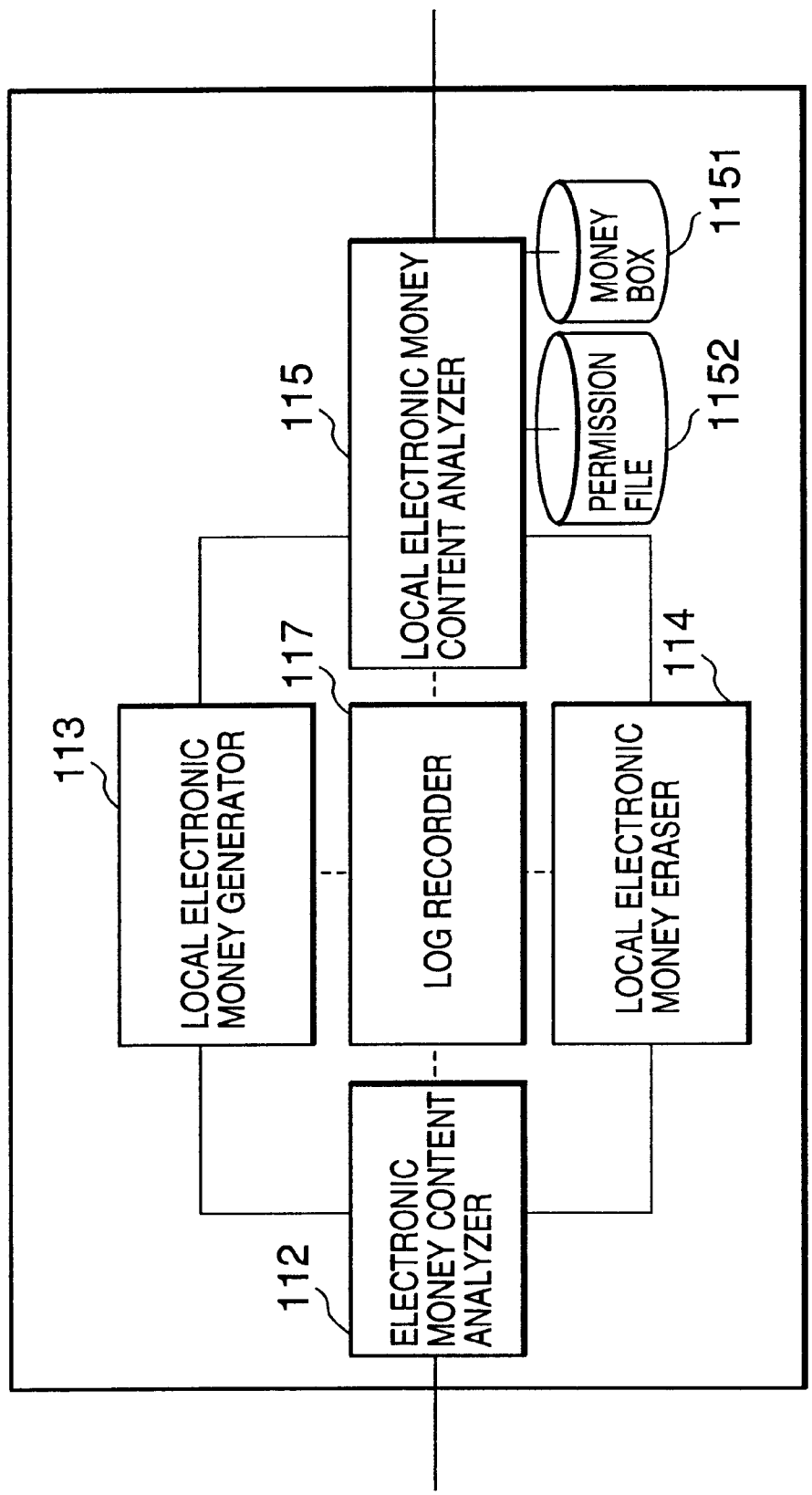
FIG. 2 is a schematic block diagram showing the function realized by a CPU executing an electronic money management program in an information processing apparatus having a communication function using a network.

FIG. 2 is a schematic block diagram showing the functions realized by a CPU executing the electronic money management program EMMP11 in an information processing apparatus having a function of communication on a network.

An electronic money content analyzer 112 analyzes electronic money received from a terminal NWU2, and sends the money to a terminal NB3. The content analyzer 112 requests the terminal NB3 to change the electronic money into cash and deposit the cash in the account. The content analyzer 112 passes information obtained by analysis of the electronic money from the terminal NWU2 to a local electronic money generator 113. According to information from a local electronic money eraser 114, the content analyzer 112 requests the terminal NB3 to withdraw an amount of cash specified by the information from the account and change it into electronic money. The content analyzer 112 receives electronic money from the terminal NB3, and sends it to the terminal NWU2.

On the basis of information from the electronic money content analyzer 112, the local electronic money generator 113 generates an amount of local electronic money corresponding to electronic money received from the terminal NWU2.

A local electronic money content analyzer 115 contains a moneybox 1151 for accommodating local electronic money held by a member of the organization having LAN20, and a permission file 1152 including information, such as the amount of local electronic money that the member can handle.

The local electronic money content analyzer 115 stores local electronic money generated by the local electronic money generator 113 in a moneybox 1151 corresponding to the user of a terminal NLU4 being a receiver (a member of the organization having LAN20), and also sends a notification of this to the terminal of the receiver. Furthermore, the local electronic money content analyzer 115 analyzes local electronic money received from the terminal NLU4 by referring to the permission file 1152 and log recorder 117, and sends analysis information to a local electronic money eraser 114.

The local electronic money eraser 114, on the basis of information from the local electronic money content analyzer 115, erases local electronic money corresponding to an amount, specified by the information, from the moneybox 1151 specified by the information, and sends a notification of this to the electronic money content analyzer 112.

The log recorder 117 records the processes of the components shown in FIG. 2.

Figure 3:
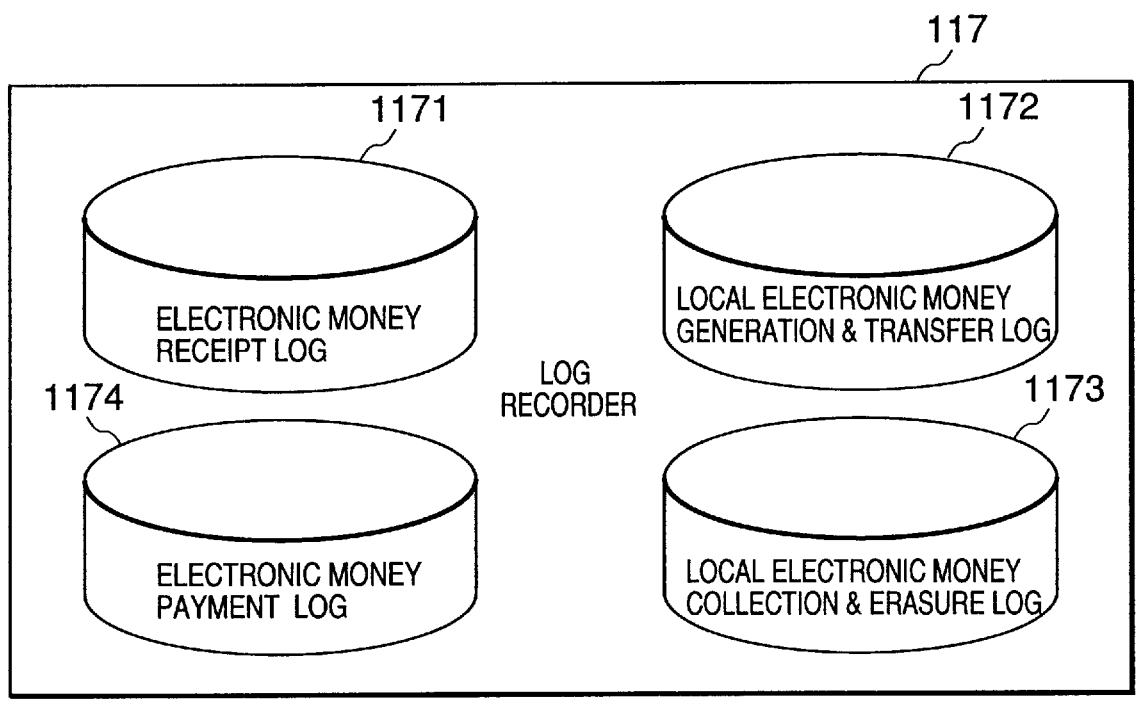
FIG. 3 is a diagram showing log files generated by a log recorder 117.

FIG. 3 is a diagram showing log files generated by the log recorder 117.

In FIG. 3, an electronic money receipt log 1171 contains records on the process of remittance of electronic money from a terminal NWU2 connected to WAN10 to a terminal NB3 and the process of money conversion to cash. A local electronic money generation and transfer log 1172 contains records on the generation and transfer processes of local electronic money. A local electronic money collection and erase log 1173 holds records on the collection and erasure processes of local electronic money. An electronic money payment log 1174 stores records on the remittance process of electronic money.

Those log files are described in the following.

FIG. 4A shows an example in the electronic money receipt log 1171.

In FIG. 4A, in the acceptance number field, the acceptance number of electronic money received at the electronic money content analyzer 112 is written in the order of acceptance. The processing date and time field indicates the date and time of acceptance of electronic money at the electronic money content analyzer 112. The sender field indicates data including the address of the user at the terminal (NWU2a or 2b) which remitted electronic money. The receiver field shows data including the address of the user at the terminal (NLU4a or 4b) as the destination of electronic money. The money-received field indicates the nominal value of electronic money. The bank name field indicates data such as the address of the bank office (NB3a or 3b) where electronic money was cashed. The authentication result field shows information about whether or not electronic money was successfully cashed.

FIG. 4B shows an example in the local electronic money generation and transfer log 1172.

In FIG. 4B, the acceptance number field indicates the acceptance number of local electronic money generated by the local electronic money generator 113 and the receipt of local electronic money is written in the order of generation. The index number field shows the acceptance number at the electronic money receipt log 1171 of electronic money, which was converted into local electronic money. The processing date and time field indicates the dates and times of generation of local electronic money. The sender field indicates the address of the user at the terminal (NWU2a or 2b) that remitted the electronic money converted to local electronic money. The money receiver field shows data including the address of the user at the receiving terminal (NLU4a or 4b) of local electronic money. The money-received field indicates the nominal value of local electronic money. The server name field indicates the name of the gateway (GW1 in this embodiment) which generated local electronic money. The remittance result fields indicate information about whether local electronic money was remitted to the receiver successfully or not.

FIG. 4C shows an example in the local electronic money collection and erase log 1173.

In FIG. 4C, in the acceptance number field, the acceptance number of local electronic money erased by the local electronic money eraser 114 is written in the order of erasure. The index field indicates the acceptance number at the local electronic money generation and transfer log 1172, of erased local electronic money. The processing date and time field indicates the date and time of erasure of local electronic money. The sender field indicates data including the address of the user at the terminal (NLU4a or 4b) that remitted local electronic money. The receiver field indicates data such as the address of the user at the terminal (NWU2a or 2b) as the destination of electronic money converted from local electronic money. The money-received field indicates the nominal value of the erased local electronic money. In the server name field, the name of the gateway (GW1 in this embodiment) which erased local electronic money is written. In the erasure result field, information about whether or not the local electronic money was erased successfully is written.

FIG. 4D shows an example in the electronic money payment log 1174.

In FIG. 4D, in the acceptance number field, the acceptance number of electronic money sent by the electronic money content analyzer 112 is written in the order of remittance. The index number field indicates the acceptance number, at the local electronic money collection and erasure log 1173, of local electronic money converted to electronic money. The processing date and time field shows the date and time of remittance of electronic money. The sender field indicates information including the address of the user of the terminal (NLU4a or 4b) as the source of remittance of local electronic money converted to electronic money is written. The receiver field indicates information such as an address of the user of the terminal (NWU2a or 2b) being the remittance destination of the local electronic money converted into electronic money. The money received field shows the nominal value of local electronic money converted into electronic money. The bank name field indicates information including the address of the bank office (NB3a or 3b) that issued the electronic money. The remittance result field indicates information about whether the electronic money was remitted successfully or not.

Description will now move on to electronic money issued by the terminal NB3. This electronic money is basically the same as that used in the electronic money digital cash system, such as ecash described in the RELATED ART above.

FIG. 5 shows an example of the format of electronic money issued at the terminal NB3.

In the Value field, the value of electronic money is written. In the Serial field, the serial number by which the bank manages the issuance of electronic money is written. In the Generator field, the address of the bank office that generated electronic money is written. The Signature field indicates a digital signature which was obtained by encrypting the contents of the above-mentioned fields using a secret key that the bank possesses. This digital signature certifies that the bank shown in the Generator field generated electronic money.

Description will now proceed to local electronic money current only in LAN20.

FIG. 6 shows an example of the format of local electronic money generated by the local electronic money generator 113 shown in FIG. 2.

The Value field indicates the value of electronic money converted to local electronic money. In the Serial field, the serial number of this local electronic money is written. This serial number indicates the number in the order of generation at GW1 and the same number is not used again. Written in the From field is data including the address of the user at the terminal (NWU2a or 2b) as the source of remittance of electronic money converted into the local electronic money. In the To field, data including the address of the user at the receiving terminal (NLU4a or 4b) of local electronic money is written. The Generator field indicates data including the address of the gateway (GW1 in this embodiment) that issues local electronic money. The Signature field indicates a digital signature which was obtained by encrypting the above-mentioned content of the fields with a secret key possessed by the bank.

Description will next be given of the operation of the network apparatus to which this embodiment is applied.

In this embodiment, to avoid wiretapping on the network, all data or messages, including electronic money, are subject to encryption processing using the public-key encryption system before they are transmitted on the network. A digital signature obtained by encrypting the data or message with the secret key of the user at the sending terminal is added to each data or message.

Description will now continue with the operation of making remittance from a terminal NWU2 connected to WAN10 to a terminal NLU4 connected LAN20.

Figure 7:
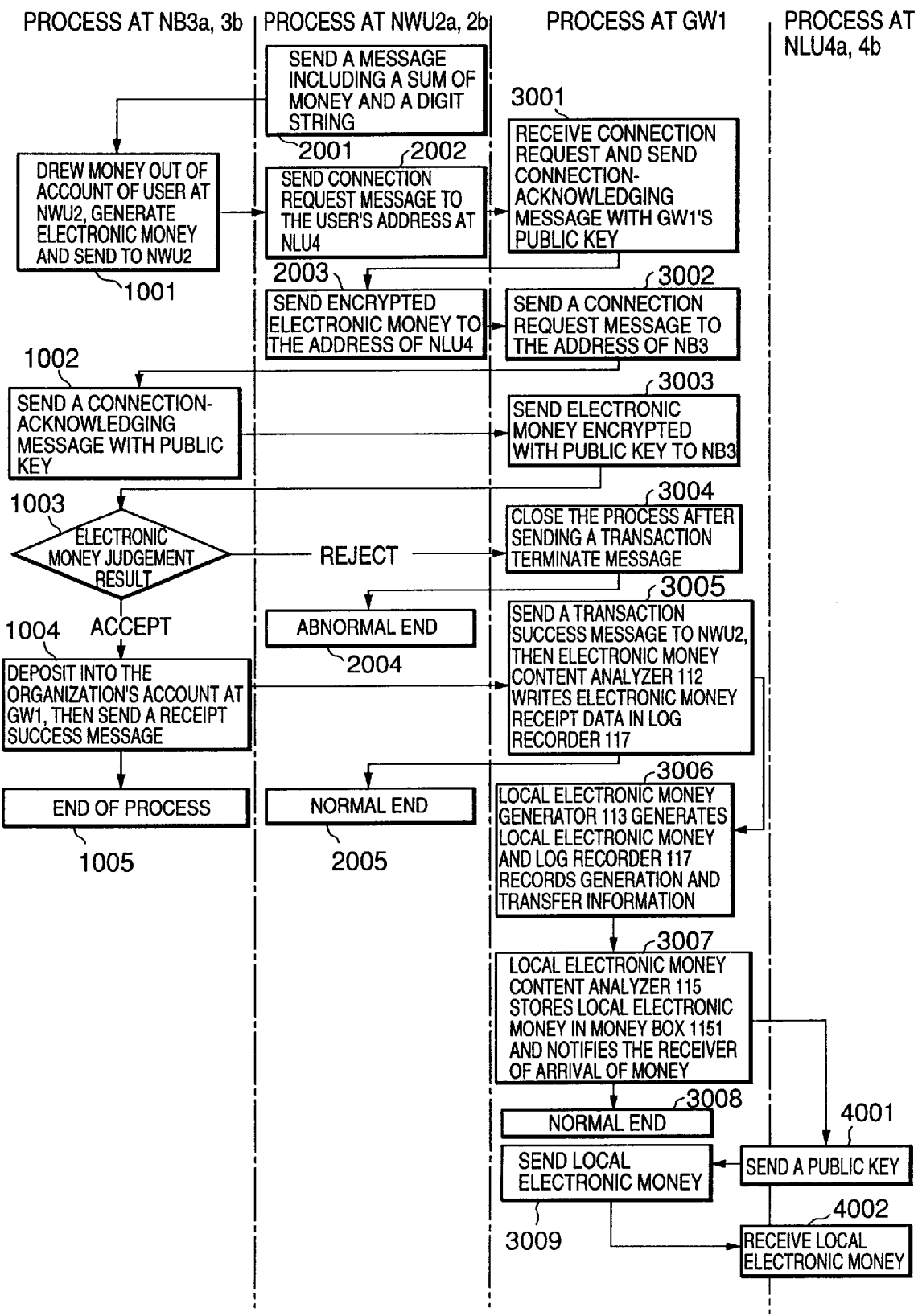
FIG. 7 is a flowchart for explaining the operation of remittance from terminal NWU2 to terminal NLU4.

FIG. 7 is a flowchart for explaining the operation of making remittance from a terminal NWU2 to a terminal NLU4.

A user at a terminal NWU2 sends a connection request message to a terminal NB3 of the bank where his own account has been opened. On receiving the connection request message, the terminal NB3 sends a connection-acknowledging message to the terminal NWU2. Thus, a connection is established between the terminal NWU2 and the terminal NB3.

Subsequently, the terminal NWU2 performs a process by a specific function using the amount of money to remit to a terminal NLU4 and a random number it generates as arguments to thereby generate a string of digits. A message requesting the issuance of electronic money has a generated digit string (blind signature) appended and is sent to the terminal NB3 (Step 2001).

When receiving this message, the terminal NB3 withdraws the amount requested from the account of the user at the terminal NWU2, changes the money into electronic money as shown in FIG. 5, and after encryption, sends an encrypted electronic money to the terminal NWU2 (Step 1001). Then, NWU2 releases the connection with the terminal NB3.

The terminal NWU2, when receiving electronic money from the terminal NB3, sends a connection request message to the terminal NLU4 as the receiver of remittance (Step 2002). This connection request message is received by GW1 before reaching the terminal NLU4. In response to the message, the GW1 performs a money receiving procedure on behalf of the terminal NLU4.

GW1 passes the connection request message through TP12a to the electronic money content analyzer 112 of EMMP11. Accordingly, the electronic money content analyzer 112 sends a connection-acknowledging message accompanied by a public key of GW1 to TP12a. TP12a sends this message received from the content analyzer 112 to the terminal NWU2 that sent the connection request (Step 3001). Thus, a connection is established between GW1 and the terminal NWU2.

The terminal NWU2, when receiving the connection-acknowledging message, encrypts electronic money, which is to be remitted, using a public key attached to the connection-acknowledging message, and sends encrypted electronic money to the terminal NLU4 as the destination of remittance (Step 2003). The encrypted electronic money is received by GW1 before reaching the terminal NLU4, and changed by GW1 to local electronic money. Local electronic money is transmitted to the terminal NLU4 as the destination of remittance.

GW1 passes encrypted electronic money through TP12a to the electronic money content analyzer 112 of EMMP11.

The electronic money content analyzer 112 decrypts encrypted electronic money using its own secret key, and checks the name of the bank that issued the electronic money from decrypted electronic money. Then, the electronic money content analyzer 112 sends a connection request message to TP12a. TP12a sends the message received from the electronic money content analyzer 112 to the terminal NB3 of the bank revealed at the electronic money content analyzer 112 (Step 3002).

When receiving the connection request message, the terminal NB3 sends a connection-acknowledge message along with its own public key to GW1 that sent the connection request message(Step 1002). Consequently, a connection is established between the terminal NB3 and GW1.

GW1 sends the connection-acknowledge message from the terminal NB3 through TP12a to the electronic money content analyzer 112 of EMMP11. The electronic money content analyzer 112 encrypts electronic money received from the terminal NWU2 using a public key attached to the connection-acknowledging message, and sends the encrypted electronic money to TP12a. TP12a sends encrypted electronic money received from the electronic money content analyzer 112 to the terminal NB3 (Step 3003).

When receiving the encrypted electronic money, the terminal NB3 decrypts the electronic money using its own secret key, and makes a judgment whether or not to approve the receipt of the electronic money by checking the serial number and the digital signature of decrypted electronic money (Step 1003). When receipt is rejected as a result of judgement, NB3 sends a rejection message to GW1. After this, NB3 releases the connection with GW1.

GW1 sends a receipt rejection message, which has come from NB3, through TP12a to the electronic money content analyzer 112 of EMMP11. In response, the electronic money content analyzer 112 sends a transaction failure message to TP12a. TP12a sends the transaction failure message transmitted from the electronic money content analyzer 112 to the terminal NWU2 that sent the electronic money (Step 3004). Subsequently, GW1 releases the connection with the terminal NWU2.

The terminal NWU2 terminates the process after receiving a transaction failure message (Step 2004).

On the other hand, when it approves the receipt of remittance as a result of judgement, the terminal NB3 changes electronic money, received from GW1, to cash and deposits the cash into the account of the organization to which the user at the terminal NLU4 belongs. Then, NB3 sends a receipt success message to GW1 (Step 1004). After this, the terminal NB3 terminates the process by releasing the connection with GW1 (Step 1005).

When receiving the receipt success message from the terminal NB3, GW1 sends this message through TP12a to the electronic money content analyzer 112 of EMMP11. In response to this, the electronic money content analyzer 112 sends a transaction success message to TP12a. TP12a sends the transaction success message, received from the electronic money content analyzer 112, to the terminal NWU2 that sent the electronic money. The connection established between the terminal NWU2 and GW1 is then released.

The log recorder 117 writes electronic money receipt information in the electronic money receipt log 1171 (Step 3005). As shown in FIG. 4A, the acceptance number, processing date and time, sender, receiver, money received, bank name, and receipt success/failure message are written in the related fields.

The terminal NWU2 terminates the process after receiving the transaction success message (Step 2005).

After the process at Step 3005 is closed, the electronic money content analyzer 112 of GW1 notifies the acceptance number, recorded by the log recorder 117 in the electronic money receipt log 1171, to the local electronic money generator 113. In response to this, the local electronic money generator 113, searches the electronic money receipt log 1171 by using the acceptance number received from the electronic money content analyzer 112, and reads received money information corresponding to the acceptance number. The local electronic money generator 113 generates an amount of local electronic money corresponding to the amount of money received. The log recorder 117 writes information about generation and transfer of local electronic money in the local electronic money generation and transfer log 1172 (Step 3006). As shown in FIG. 4B, in the field of acceptance number, the number in the order of processing is written. In the field of processing date and time, the date and time when the information is written is indicated. In the fields of sender, receiver and money received, information in the electronic money receipt log 1171 is copied. In the field of money change server, the name of GW1 is written. At this point in time, no information is written in the field of remittance result.

The local electronic money generator 113 of GW1 sends generated local electronic money along with information written in the local electronic money generation and transfer log 1172 to the local electronic money content analyzer 115. In response to this, the local electronic money content analyzer 115 stores local electronic money in a moneybox 1151 of the receiver determined by the supplied information. Then, a message indicating the arrival of local electronic money is sent through TP12b to the terminal NLU4 of the receiver (Step 3007). Subsequently, GW1 releases the connection with the terminal NLU4.

Next, the log recorder 117 writes a remittance result in the field of remittance result in the local electronic money generation and transfer log 1171. GW1 terminates the process (Step 3008).

The user (a member of the organization) at the terminal NLU4 that received the message, if he wants to use local electronic money, establishes a connection with GW1, and sends his own public key to GW1 (Step 4001). GW1 passes the public key through TP12b to the local electronic money content analyzer 115. The local electronic money content analyzer 115 withdraws local electronic money from the moneybox 1151 of the user at the terminal NLU4 who sent the public key, and encrypts local electronic money with the public key, and sends the money to the terminal NLU4 (Step 3009).

The terminal NLU4 receives the encrypted local electronic money (Step 4002), and stores it in a suitable recording device. The user can use the encrypted local electronic money by decrypting it with his own secret key.

Description will be given of the operation of making remittance from a terminal NLU4 connected to LAN20 to a terminal NWU2 connected to WAN10.

Figure 8:
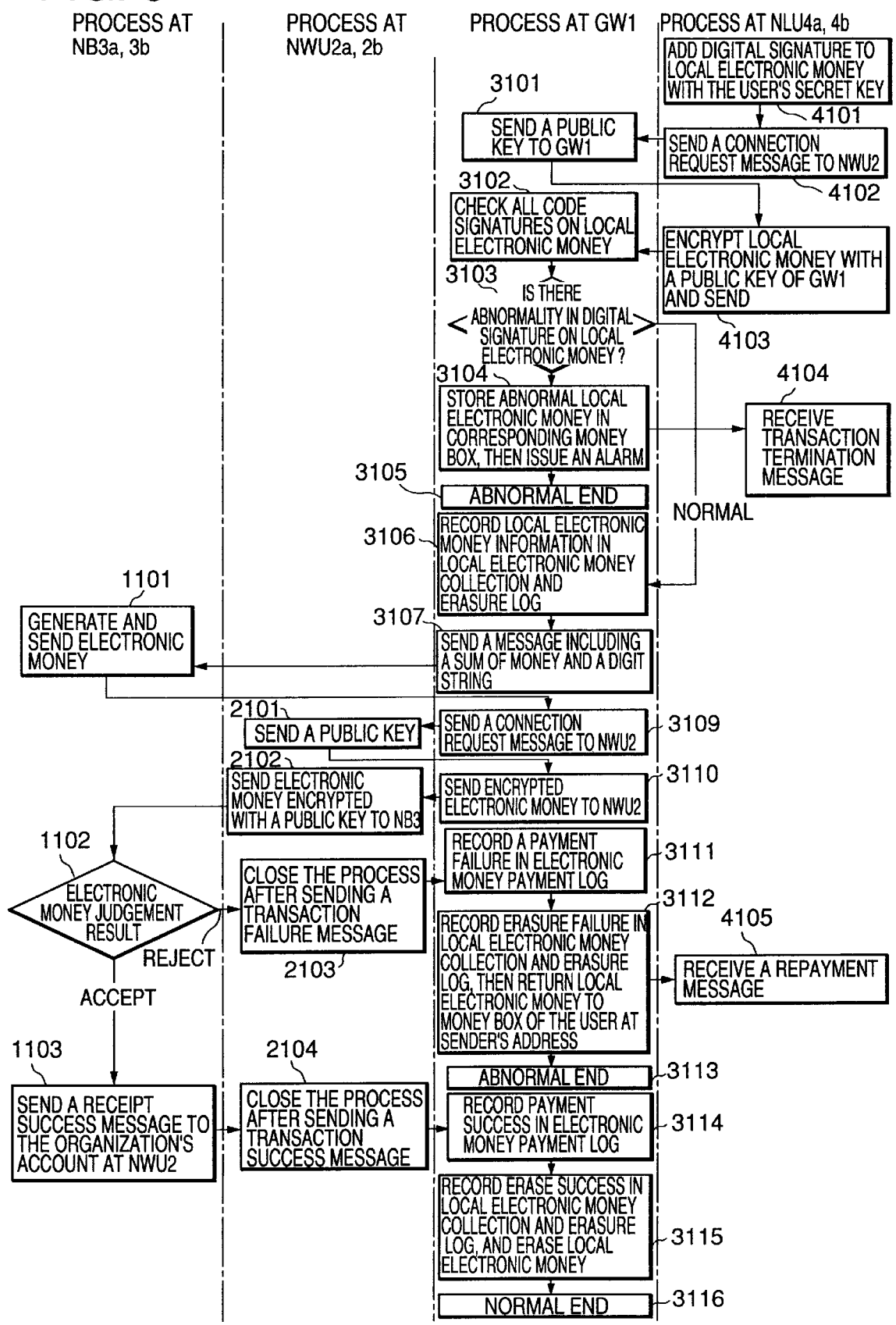
FIG. 8 is a flowchart for explaining the operation of remittance from terminal NLU4 to terminal NWU2.

FIG. 8 is a flowchart for explaining the operation of sending money from a terminal NLU4 to a terminal NWU2.

Figures 9, 10:
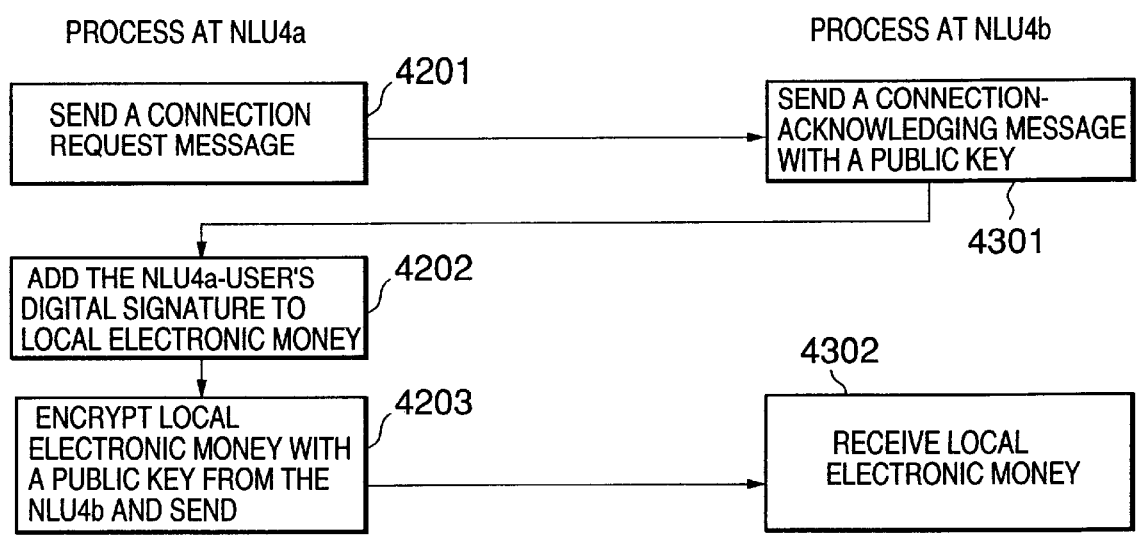
FIG. 9 is a diagram showing an example of local electronic money in FIG. 6 added with a user's digital signature.
FIG. 10 is a flowchart for explaining the operation f remittance from terminal NLU4a to terminal NWU4b.

In a terminal NLU4, after encrypted local electronic money stored in the recording device is decrypted using the user's own secret key, the local electronic money has a digital signature appended using this secret key (Step 4101). Incidentally, an example of local electronic money shown in FIG. 6 having a user's digital signature attached is shown in FIG. 9.

The terminal NLU4 sends a connection request message to a terminal NWU2 as the destination of remittance (Step 4102). This connection request message is received by GW1 before reaching the terminal NWU2. In response to the connection request message, GW1 performs a remittance procedure on behalf of the terminal NLU4.

GW1 passes the connection request message through TP12b to the local electronic money content analyzer 115 of EMMP11. In response to this, the local electronic money content analyzer 115 sends a connection-acknowledge message accompanied by GW1's public key to TP12b. TP12b sends the message conveyed by the local electronic money content analyzer 115 to the terminal NLU4 that sent the connection request message (Step 3101). Consequently, a connection is established between GW1 and the terminal NLU4.

When receiving the connection-acknowledge message, the terminal NLU4 encrypts local electronic money, which is to be remitted, with a public key attached to the connection-acknowledge message, and sends the encrypted local electronic money to the terminal NWU2 as the destination of remittance (Step 4103). The encrypted local electronic money is received by GW1 before reaching the terminal NWU2, and is converted into electronic money.

This electronic money is sent to the terminal NWU2 as the destination.

GW1 sends encrypted local electronic money through TP12b to the electronic money content analyzer 115 of EMMP11. In response thereto, the local electronic money content analyzer 115 decrypts the encrypted local electronic money using its own secret key. GW1 checks the digital signature attached to decrypted local electronic money against a previously registered public key of a user (a user using a digital signature) at the-terminal NLU4 (Step 3102).

If the public key which is required for checking a digital signature has not been registered, GW1 gets the public key transmitted by sending a message requesting the transmission of the public key to the terminal NLU4 of the user who added the digital signature.

As a result of the check, if abnormality is discovered in the digital signature (Step 3103), the local electronic money content analyzer 115 stores the local electronic money in a moneybox exclusively for abnormal local electronic money, installed inside the moneybox 1151. After this, GW1 sends a transaction termination message to TP12b. TP12b passes the received transaction termination message to the terminal NLU4 that transmitted the local electronic money. An alarm is issued to notify the manager at GW1 of the detection of abnormality in the digital signature (Step 3104). Then, GW1 releases the connection with the terminal NLU4 (Step 3105).

When receiving the transaction termination message, the terminal NLU4 terminates the process (Step 4104).

On the other hand, as a result of the check, if abnormality is not found in the digital signature (Step 3103), the local electronic money content analyzer 115 searches the local electronic money generation and transfer log 1172 of the log recorder 117 to obtain a log with the acceptance number that coincides with the serial number of the local electronic money.

If the search ended in failure, or though the search was successful, if there is a possibility that the local electronic money is a counterfeit as a result of comparison of the data on the local electronic money with the data on the log, it follows that local electronic money not under control of GW1 is circulating. Therefore, the above-described processes at Steps 3104 and 3105 are executed.

If the search is successful and if there is no possibility of counterfeit of the local electronic money according to the result of comparison between data on the local electronic money and data on the log, the local electronic money content analyzer 115 sends the local electronic money to the local electronic money eraser 114.

In response, the local electronic money eraser 114 passes the acceptance number of the local electronic money to the electronic money content analyzer 112 and also passes data and the acceptance number of the local electronic money to the log recorder 117.

The log recorder 117 writes information about local electronic money, received from the local electronic money eraser 114, in the local electronic money collection and erasure log 1173 (Step 3106). As shown in FIG. 4C, the number in the order of processing is written in the field of acceptance number. The serial number (equal to the acceptance number of the local electronic money generation and transfer log 1172) is written in the field of index number. The date and time of entry of this information is written in the field of processing date and time. The sender, the receiver and the nominal value of local electronic money are written in the fields of sender, receiver and money received, respectively. At this point in time, no information is written in the fields of money change server and erasure result.

The electronic money content analyzer 112 reads information from the local electronic money collection and erasure log 1173, the information corresponding to the acceptance number received from the local electronic money eraser 114. Next, the electronic money content analyzer 112 returns the read out information and the acceptance number to the log recorder 117. In response, the log recorder 117 writes the information about local electronic money, received from the electronic money content analyzer 112, to the electronic money payment log 1174 (Step 3106). As shown in FIG. 4D, the number in the order of processing is written in the field of acceptance number. The serial number of local electronic money (equal to the acceptance number at the local electronic money collection and erasure log 1173) is written in the field of index number. The date and time of entry of this information is written in the field of processing date and time. The sender, the receiver and the nominal value of electronic money are written in the fields of the sender, receiver and money received, respectively. At this point in time, no information is written in the fields of bank name and remittance result.

Then, the electronic money content analyzer 112 sends a connection request message to TP12a. TP12a passes the received connection request message to a terminal NB3 of a bank where an account of the organization to which the user at the terminal NLU4 belongs has been opened. When receiving the connection request message, the terminal NB3 sends a connection-acknowledging message to the source of the connection request message. Thus, a connection is established between GW1 and the terminal NB3.

The electronic money content analyzer 112 performs a process with a specific function using the amount of money to remit (the nominal value of local electronic money written on the electronic money payment log 1174) and a random number it generates as arguments to thereby generate a string of digits. The electronic money content analyzer 112 sends a message requesting the transmission of electronic money added with the above-mentioned string of digits (a blind signature) to the terminal NB3 (Step 3107).

When receiving this message to transmit electronic money, the terminal NB3 withdraws the requested amount of money from the account of the user of GW1, that is, the organization in which LAN20 is formed, and after converting the money into electronic money as shown in FIG. 5, NB3 encrypts electronic money and sends it to GW1 (Step 1101).

GW1, on receiving electronic money from the terminal NB3, sends a connection request message to the terminal NWU2 being the destination of remittance (Step 3109).

The terminal NWU2, on receiving a connection request message, sends a connection-acknowledging message with an accompanying public key to GW1 that gave NWU2 the connection request message (Step 2101). Thus, a connection is established between GW1 and the terminal NWU2.

GW1, on receiving the connection-acknowledging message, encrypts a remittance amount of electronic money using the public key that came with the connection-acknowledging message, and sends encrypted electronic money to the terminal NWU2 being the destination of remittance (Step 3110).

The terminal NWU2, on receiving encrypted electronic money, decrypts the electronic money using its own secret key to thereby find a bank name that issued the electronic money from the decrypted electronic money. Then, NWU2 sends a connection request message to a terminal NB3 of that bank.

The terminal NB3, on receiving the connection request message, sends a connection-acknowledging message with its own public key to the terminal NWU2 that sent the connection request message. As a result, a connection is established between the terminal NWU2 and the terminal NB3.

The terminal NWU2 encrypts electronic money received from GW1 with a public key that came with the connection-acknowledging message, and sends the encrypted electronic money to the terminal NB3 (Step 2102).

The terminal NB3, on receiving the encrypted electronic money, decrypts the electronic money using its own secret key. The terminal NB3 checks the serial number and a digital signature on the decrypted electronic money and thereby judges whether or not to approve the receipt of the electronic money (Step 1102). As a result of the check, if it rejects the receipt of electronic money, NB3 sends a reject message to the terminal NWU2. Subsequently, NB3 releases the connection with NWU2.

In response to this, the terminal NWU2 sends a transaction failure message to GW1 (Step 2103), and then terminates the process.

GW1 passes the transaction failure message, received from the terminal NWU2, through TP12a to the electronic money content analyzer 112. In response to this, the electronic money content analyzer 112 sends this information to the log recorder 117 and the local electronic money content analyzer 115. The log recorder 117 writes "FAILURE" in the field of the remittance result of the electronic money payment log 1174 and the fields of erasure result of the local electronic money collection and erasure log 1173 (Steps 3111 and 3112). The local electronic money content analyzer 115 returns local electronic money corresponding to the amount of electronic money involved in the transaction failure to the moneybox 1151 for the terminal NLU4 of the money sender. GW1 sends the money sender at the terminal NLU4 a message indicating that the local electronic money has been returned (Step 3112). GW1 then terminates the process by releasing the connection with the terminal NLU4 (Step 3113).

The terminal NLU4 terminates the process, when it receives the message indicating that the local electronic money has been returned (Step 4105).

If the terminal NB3 permits the receipt of the electronic money as a result of the check, it changes the electronic money received from the terminal NWU2 into cash, has the cash deposited in the account of the user using the terminal NWU2, and sends a receipt success message to the terminal NWU2. Then, NB3 terminates the process by releasing the connection with the terminal NWU2 (Step 1103).

In response to this, the terminal NWU2 sends a transaction success message to GW1, and terminates the process by releasing the connection with GW1 (Step 2104).

When receiving the transaction success message from the terminal NWU2, GW1 passes this message, sent from the terminal NWU2 through TP12a, to the electronic money content analyzer 112. In response to this, the electronic money content analyzer 112 passes this information to the log recorder 117. The log recorder 117 writes "SUCCESS" in the remittance result field of the electronic money payment log 1174 and also in the erasure result field of the local electronic money collection and erasure log 1173 (Steps 3114 and 3115). Then, GW1 terminates the process by releasing the connection with the terminal NLU4 (Step 3116).

Description will be given of the operation in a transaction between terminals NLU4 connected to LAN20.

FIG. 10 is a flowchart for explaining the operation of remittance from a terminal NLU4a to a terminal NLU4b.

The terminal NLU4a sends a connection request message to the terminal NLU4b being the destination of remittance (Step 4201).

The terminal NLU4b, when receiving the connection request message, sends a connection-acknowledging message with its own public key to the terminal NLU4a that gave NLU4b the connection request message (Step 4301). Thus, a connection is established between the terminals NLU4a and NLU4b.

Next the terminal NLU4a, using its own secret key, decrypts the encrypted local electronic money which has been stored in a storage device, and adds a digital signature to the local electronic money by using the secret key (Step 4202). Then, the terminal NLU4a encrypts the local electronic money using a public key received from the terminal NLU4b, and sends the encrypted local electronic money to the terminal NLU4b (Step 4203). After this, NLU4a releases the connection with the terminal NLU4b.

The terminal NLU4b receives the encrypted local electronic money (Step 4302), and stores it in a suitable storage device. The user can use the encrypted local electronic money by decrypting it using its own secret key.

A preferred embodiment of the present invention has been described.

As described above, in this embodiment, electronic money that can be handled by the terminals NLU4 connected to LAN20 is limited to a kind of electronic money current only in LAN20. More specifically, the electronic money is limited to local electronic money, a different kind of electronic money from electronic money issued by terminals NB3.

When a terminal NLU4 connected to LAN20 conducts electronic commerce with a terminal NWU2 connected to WAN10, a money change process at GW1 is invariably involved in the settlement of accounts. In addition, the contents of the process are recorded in a log.

In other words, in the present embodiment, when a member of an organization having LAN20 formed therein conducts electronic commerce with a user outside the organization, a money change process at GW1 between electronic money and local electronic money is always carried out in the settlement of accounts, and the process is recorded in a log. Therefore, the administrative department (accounting or materials department, for example) can manage the account settlement between a member of the organization and a user outside the organization by monitoring the log in which the details of the process at GW1 are recorded. Accordingly, it is possible to minimize damage resulting from an error in remittance or embezzlement.

Local electronic money can be interchanged directly between the members of an organization without intervention of GW1, in which case anonymity as the advantage in settlement by electronic money can be maintained.

In the embodiment mentioned above, description has been given of the electronic money digital cash system on the assumption of the use of ecash that adopts blind signature that provides electronic money with superlative anonymity (Scientific American, August 1992, pp. 96–101). However, the present invention is not limited to this electronic money, but may be applied to various electronic money digital cash systems.

In the present embodiment, discussion has been devoted to the electronic money management apparatus which has a gateway adapted to perform a money change function and is located between LAN20 and WAN10. However, the present invention is not limited to this arrangement, but the apparatus (a network apparatus, such as a gateway or a router), which can intercept electronic money flowing from one network to another, should be provided with a money change function.

Furthermore, in the present embodiment, description has been given of the electronic money management system wherein in the interchange of local electronic money, local electronic money can be transferred directly between the terminals NLU4a and NLU4b connected to LAN20 without using an intervening GW1. However, the present invention is not limited to this type, but the intervening GW1 may be employed.

Description will now be given of a first modification of the present embodiment, in which an intervening GW1 is used in the interchange of local electronic money between the terminals NLU4a and NLU4b.

In this first modification, GW1 is charged with not only with vicariously executing money remittance but also changing received local electronic money for local electronic money of proper nominal values and making remittance.

Figure 11:
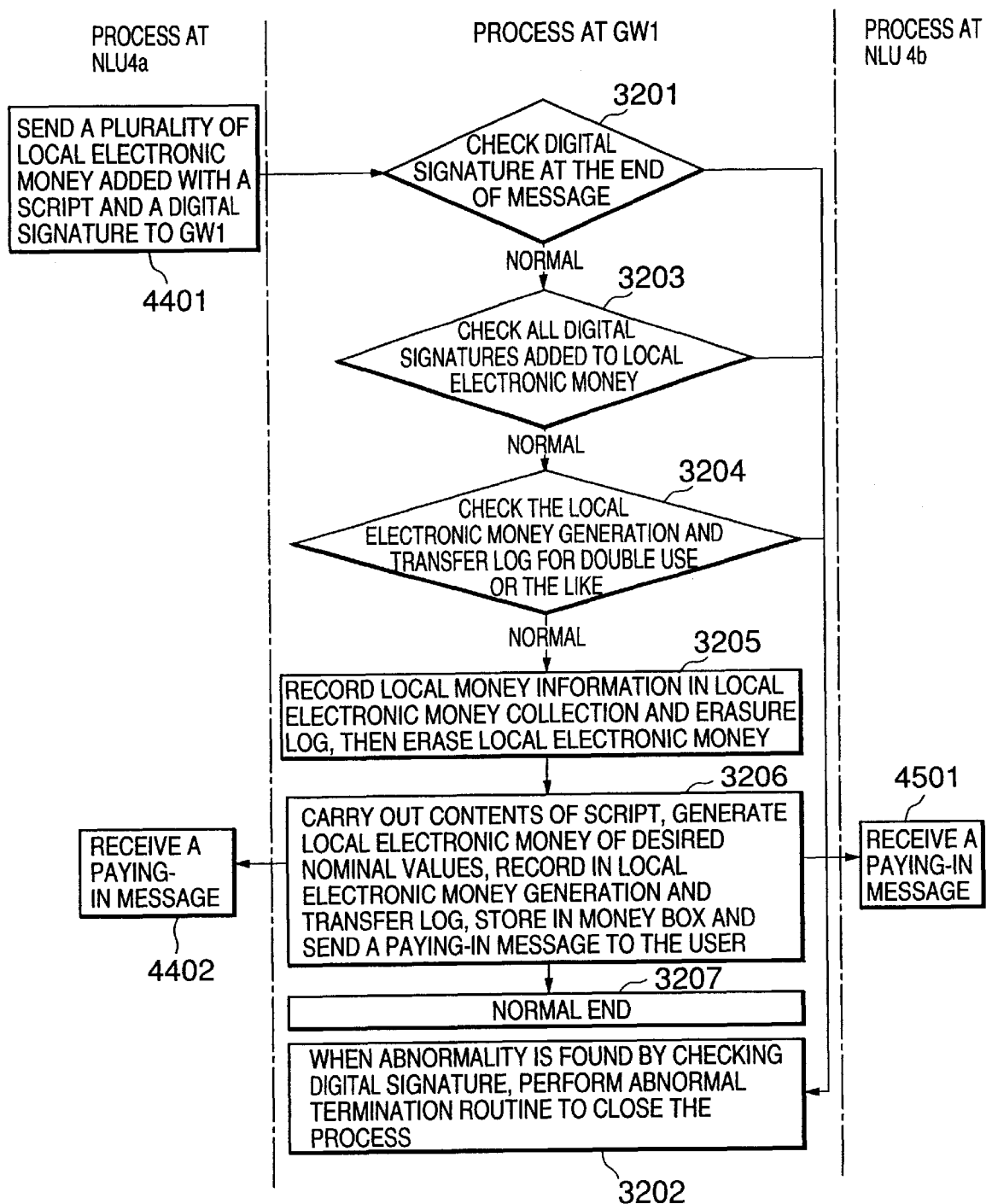
FIG. 11 is a flowchart for explaining the operation f remittance from terminal NLU4a to terminal NLU4b in a first modification of the embodiment.

FIG. 11 is a flowchart for explaining the operation of remittance from the terminal NLU4a to the terminal NLU4b in the first modification of the present embodiment.

The terminal NLU4a retrieves a plurality of local electronic money stored in a storage device, creates a message including the local electronic money added with a script of the contents of a request to GW1 and a digital signature, and sends the message to GW1 (Step 4401).

FIG. 12 shows an example of a message to be sent by the terminal NLU4 on the sender side to GW1 in the first modification of the present embodiment.

In FIG. 12, reference numerals 701 to 703 denote a plurality of local electronic money retrieved from the storage device. FIG. 12 shows the same format (but in a simple form) for these electronic money as in FIG. 6. Reference numeral 704 denotes a script and a digital signature added to local electronic money 701 to 703.

In FIG. 12, the contents of the script are as follows.

@ sum (256, 303, 386)

Sum up local electronic money of serial numbers 256, 303 and 386.

@ div (¥1,000,000: user1)

Send ¥1,000,000 to the user at the terminal NLU4b.

@ bal (:ME):

Return the balance to the source of remittance.

The digital signature at the end of the message is formed by encryption of the message from its head portion till the end of the script using a secret key of the user at the terminal NLU4a as the source of remittance.

When receiving the message from the terminal NLU4a, GW1 passes the message through TP12b to the local electronic money content analyzer 115. In response to this, the local electronic money content analyzer 115 checks the digital signature attached at the end of the message (Step 3201).

If abnormality is found by checking the digital signature, GW1 performs an abnormal termination routine to close the process (Step 3202). On the other hand, when abnormality is not found, the local electronic money content analyzer 115 checks the digital signature on each piece of local electronic money (reference numerals 701 to 703 in FIG. 12) included in the message received (Step 3203).

If abnormality is found as a result of the check, an abnormal termination routine is performed to terminate the process (Step 3202). On the other hand, if no abnormality is found, the local electronic money content analyzer 115 searches the local electronic money generation and transfer log 1172 to retrieve a log with an acceptance number coincident with the serial number of each piece of local electronic money included in the message received. Then, the money content analyzer 115 checks for double use or the like of local electronic money from data on the log retrieved (Step 3204).

If abnormality is found by the check, GW1 performs an abnormal termination routine to close the process (Step 3202). If no abnormality is found, the local electronic money content analyzer 115 transfers the local electronic money received and its acceptance number to the local electronic money eraser 114. The log recorder 117 writes information regarding each local electronic money included in the message received by the local electronic money content analyzer 115 in the local electronic money collection and erasure log 1173 (Step 3205). At this point, no data is written in the fields of the money change server and the erasure result in the local electronic money collection and erasure log 1173. In addition, the local electronic money is not erased.

On receiving local electronic money and its acceptance number from the money content analyzer 115, the local electronic money eraser 114 sends a request to the local electronic money generator 113 to generate local electronic money. The request includes information about the receiver, sender, money received, and a script shown in FIG. 12.

The local electronic money generator 113 generates local electronic money according to the request from the local electronic money eraser 114 (specifically, the contents of the script in FIG. 12), adds information about destinations specified by the request (¥1,000,000 to the terminal NLU4b; ¥208,000 to be returned to the terminal NLU4a in the example in FIG. 12) to the local electronic money, and sends the local electronic money to the local electronic money content analyzer 115. The log recorder 117 records information required for generation and management of local electronic money to the local electronic money generation and transfer log 1172. Subsequently, the local electronic money generator 113 sends a message to the local electronic money eraser 114.

The local electronic money eraser 114 erases the local electronic money sent from the terminal NLU4a of the sender. The log recorder 117 writes information in the empty fields, that is, in the money change server field and the erasure result field in the local electronic money collection and erasure log 1173.

Subsequently, the local electronic money content analyzer 115 stores the local electronic money received from the local electronic money generator 113 into the moneybox 1151 of the user specified by the destinations information added to the local electronic money. FIG. 13 shows, in the first modification of the present embodiment, the local electronic money to be deposited in the moneybox 1151 as the destination of remittance according to the message shown in FIG. 12. In this case, local electronic money worth ¥1,000,000 is transferred to the terminal NLU4b, while local electronic money worth 536 208,000 is transferred to the terminal NLU4a. The format of the local electronic money is the same as in FIG. 6, but is illustrated here in a simplified form.

The local electronic money content analyzer 115 sends a paying-in message for the terminal NLU4 of destination to TP12b. TP12b sends the paying-in message to the destination (Step 3206). GW1 then terminates the process (Step 3207).

The terminals NLU4a and NLU4b can confirm that local electronic money has been paid in, by receiving a paying-in message from GW1. (Steps 4402 and 4501)

In the first modification of the present embodiment, the users of the terminals NLU4 can use electronic money of various nominal values by having electronic money exchanged by GW1 into electronic money of desired nominal values. In the first modification, the establishment operation of a connection between a terminal NLU4 and GW1 in the present embodiment applies and its description is omitted.

In the present embodiment, when money is sent from a terminal NLU4 connected to LAN20 to a terminal NWU2 connected to WAN10, description has been given of a case where GW1 performs the remittance procedure on behalf of the terminal NLU4. However, the present invention is not limited to this method. GW1 may be arranged to manage the value of money that each user at a terminal NLU4 connected to LAN20 sends to a terminal NWU2 connected to WAN10, in addition to its vicarious procedures of remittance.

As a second modification of the present embodiment, description will be given of a case where an upper limit is set for the value of money that a user of a terminal NLU4 (a member of an organization) sends to another user at a terminal NWU2 (a user outside the organization).

Suppose that a user at a terminal NLU4 sends a large sum of money higher than the upper limit allotted to the user, in other words, in excess of his authority, to another user at a terminal NWU2 (a user outside the organization).

GW1 receives through TP12b local electronic money sent from the terminal NLU4 and passes it to the local electronic money content analyzer 115. In response to this, the local electronic money content analyzer 115 reads the nominal value from the Value field and information about the sender from the To field on the received local electronic money (FIG. 6), and examines a limit of remittance imposed on the sending user at the terminal NLU4 stored in the permission file 1152.

FIG. 14 shows an example of the data stored in the permission file 1152.

In FIG. 14, the name of the user at the terminal NLU4, that is, a member of the organization having LAN20 formed therein, is written in the user field. The maximum amount that can be sent by the user at a time is written in the maximum remittance amount field. The address of the receiver to which the user can send money is written in the receiver address field.

As a result of the remittance limit examination, if it makes a decision that the nominal value of the local electronic money that the user sent is larger than the upper limit, the local electronic money content analyzer 115 stores the money in the money box 1151 of the user. Then, the content analyzer 115 sends a repayment message through TP12b to the user at the terminal NLU4. If the local electronic money content analyzer 115 decides that the upper limit is not exceeded, GW1 performs the remittance procedure on behalf of the NLU4 by following the same steps as in the present embodiment described above (by procedure from and after Step 3102 on in FIG. 8).

In a second modification, even when a member of an organization (a user at a terminal NLU4) tries to send a large sum of money in excess of his authorization to a user out of the organization (terminal NWU2), this procedure is refused by GW1.

In the second modification, it may be so arranged that even if the sum of remittance is larger than the permissible upper limit, he can still make a remittance if he obtains approval from another member (his superior officer, for example) of the organization.

Figure 15:
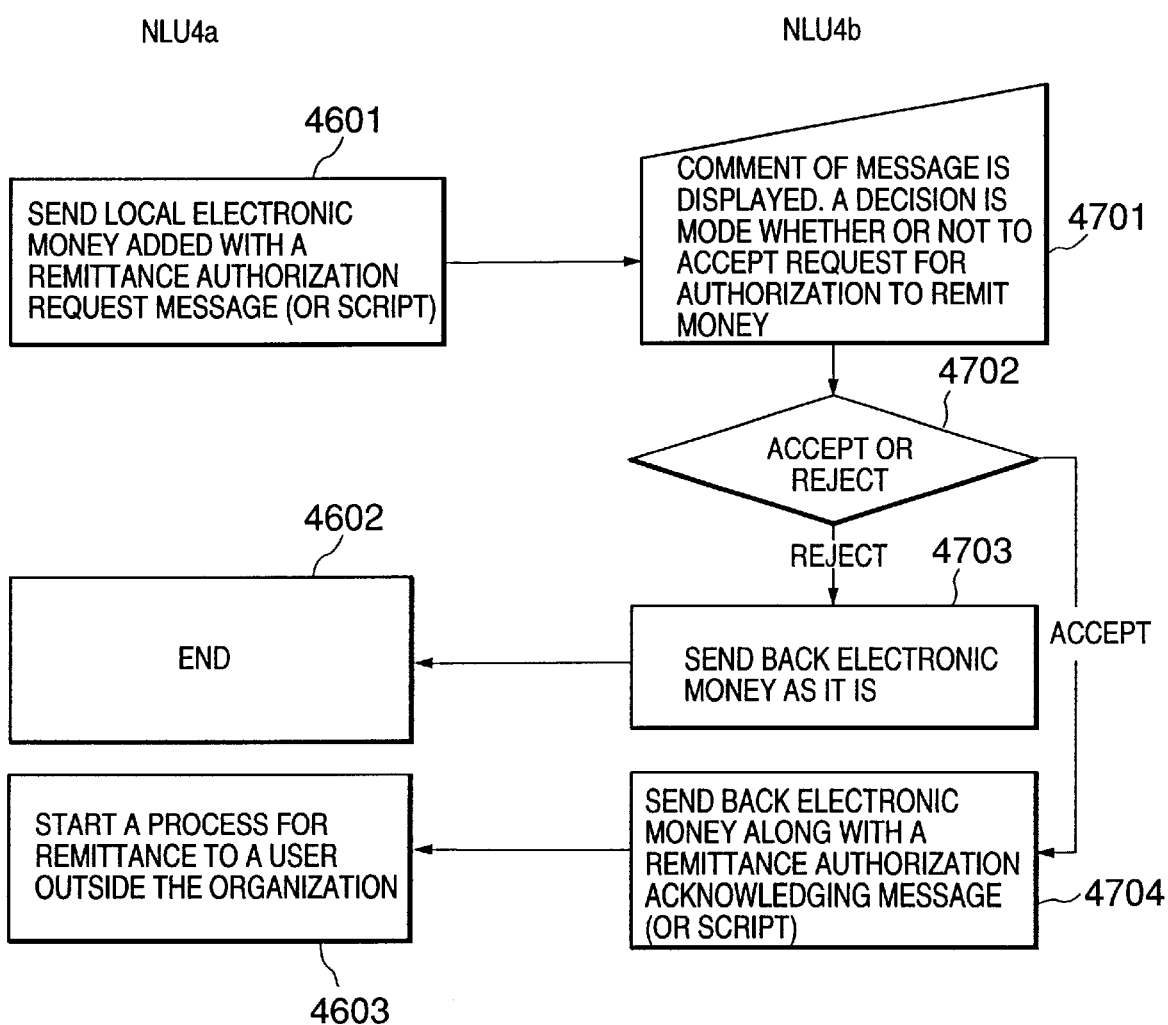
FIG. 15 is a flowchart for explaining the operation for the user at the terminal NLU4a to obtain authority from the user at the terminal NLU4b in a second modification of the embodiment of the present invention.

FIG. 15 is a flowchart for explaining the operation when a user at a terminal NLU4a obtains approval from a user at a terminal NLU4b in the second modification.

The user at the terminal NLU4a retrieves local electronic money that he is going to send outside the organization from a storage device, and attaches a remittance authorization request message, including a script and a digital signature, to the local electronic money, and sends the money to the terminal NLU4b to obtain approval (Step 4601).

FIG. 16 is a diagram showing an example of local electronic money with a remittance authorization request message attached thereto in the second modification.

In FIG. 16, reference numeral 711 denotes local electronic money retrieved from the storage device. The format of this electronic money is the same as that in FIG. 6, but is illustrated here in a simple form. Reference numeral 712 denotes a remittance authorization request message (a script and a digital signature) attached to the local electronic money 711.

In FIG. 16, the contents of the script are as follows.

@ message 35429:

A request for approval of remittance for settlement No. 35429

@ comment

The script "This is to request that approval be given to my making a remittance as per settlement No. 35429." following the comment is sent as a message to the destination of remittance. The user at the receiving terminal reads this message and decides whether or not to approve the request.

The digital signature at the end of the message was formed by encrypting the contents from the beginning of the message to the end of script using a secret key of the user at the sending terminal NLU4a.

The user at the terminal NLU4b reads the comment of the script attached to the local electronic money received from the terminal NLU4a, and decides whether or not to grant authorization to remit this local electronic money (Step 4701). If authorization to remit is not granted (Step 4702), the local electronic money is sent back to the terminal NLU4a (Step 4703). In this case, even if the user at the terminal NLU4a wants to send the local electronic money to a user outside the organization (a user at the terminal NWU2), money change to electronic money is refused by GW1, so that settlement is impossible. Therefore, the terminal NLU4a has to close the process (Step 4602).

On the other hand, when the authorization to remit money is granted (Step 4702), the user at the terminal NLU4b attaches an authorization grant message, consisting of a script and a digital signature, to the local electronic money having an authorization request message attached thereto and received from the terminal NLU4a, and sends the local electronic money back to the terminal NLU4a (Step 4704).

FIG. 17 is a diagram showing an example of local electronic money with an accompanying authorization grant message in the second modification.

In FIG. 17, reference numeral 713 denotes an authorization grant message. Reference numerals 711 and 712 denote local electronic money accompanying authorization request message sent from the terminal NLU4a, which are identical with those in FIG. 16.

In FIG. 17, the contents of the script are as follows.

@ message accepted:

The request for approval of your message is accepted.

@ comment

The script "message accepted" following the comment is sent to the terminal NLU4a. By reading this message, the user at the terminal NLU4a knows that he is permitted to send money.

Even when the local electronic money content analyzer 115 decides that the local electronic money received through TP12b from the terminal NLU4a is larger than the permissible maximum remittance of the user at the terminal NLU4a stored in the permission file 1152, if an authorization grant message is attached to the local electronic money, GW1 performs the remittance procedure by following the same steps (from and after Step 3102 on in FIG. 8) as in the present embodiment.

As has been described, according to the present invention, when electronic money is remitted from one network to another, a money change server is used to change electronic money current only within one network into electronic money current within another network.

Therefore, when the users on a network utilize a settlement process using electronic money, by managing the money change process, it becomes possible to manage the interchange of electronic money with the users on another network without affecting the working environment of electronic commerce.

What is claimed is:

1. An electronic money management method employing an electronic money digital cash system, said method employing:

local electronic money usable on a LAN which employs a same currency as wide electronic money usable on a WAN, said local electronic money being usable only within an organization in which said LAN is operable;

a network device, connected to said LAN and said WAN, for mediating electronic money transactions between a terminal connected to said LAN and a terminal connected to said WAN, said network device carrying out the jobs of:

as a first job, receiving from said LAN said local electronic money encrypted by an encryption key of said network device whose destination terminal is a terminal connected to said WAN, decrypting said local electronic money by a decryption key of said network device to confirm the amount of said local electronic money, requesting issuance of said wide electronic money in the same amount as said local electronic money thus received to an issue server connected to said WAN, and upon receipt of said wide electronic money encrypted by said encryption key of said network device from said issue server, decrypting said wide electronic money by said decryption key of said network device to confirm the amount of said wide electronic money, erasing said local electronic money thus received, and encrypting said wide electronic money by an encryption key of said destination terminal of said local electronic money thus received to transmit said wide electronic money thus encrypted to said destination terminal of said local electronic money thus received through said WAN; and as second job, receiving from said WAN said wide electronic money encrypted by said encryption key of said network device whose destination terminal is a terminal connected to said LAN, decrypting said wide electronic money by said decryption key of said network device to confirm the amount of said wide electronic money, encrypting said wide electronic money thus decrypted by an encryption key of a receiving server connected to said WAN, transmitting said wide electronic money thus encrypted to said receiving server, and upon receipt of acknowledge from said receiving server as to receipt of said wide electronic money, generating said local electronic money in the same amount as said wide electronic money, and encrypting said local electronic money by an encryption key of said destination terminal of said wide electronic money thus received to transmit said local electronic money thus encrypted to said destination terminal of said wide electronic money thus received through said LAN.

2. An electronic money managing method according to claim 1, wherein:

said issue server and said receiving server is a server of a bank that has an account of said organization in which said LAN is operable;

said issue server subtracts the same amount of money as said wide electronic money transmitted to said network device from said account of said organization; and said receiving server adds the same amount of money as said wide electronic money received from said network device to said account of said organization.

3. An electronic money managing method according to claim 1, wherein:

histories as to erasing of said local electronic money and transmission of said wide electronic money carried out by said network device in said first job, and histories as to reception of said wide electronic money and generation of said local electronic money carried out by said network device in said second job, are stored in said network device.

4. An electronic money managing method according to claim 1, wherein:

in said first job, if the amount of said local electronic money received from said LAN whose destination terminal is the terminal connected to said WAN exceeds a predetermined amount allocated to a member of the terminal connected to said LAN, the received local electronic money is sent back to the terminal connected to said LAN which is a transmitting origin of said local electronic money, without making the request for issuance of said wide electronic money to said issue server connected to said WAN.

5. An electronic money managing method according to claim 4, wherein:

in said first job, when the amount of said local electronic money received from the LAN whose destination terminal is the terminal connected to said WAN exceeds a predetermined amount allocated to a member of the terminal connected to said LAN, and said local electronic money has a message that the member of the terminal connected to said LAN which was the transmitting origin of said local electronic money is allowed to transmit such an amount exceeding said predetermined amount allocated, making the request for issuance of said wide electronic money to said issue server connected to said WAN, then executing the additional first job procedures.

6. An electronic money management method according to claim 1, wherein:

said network device further carries out the job of:

as a third job, changing a combination of units comprising said local electronic money transmitted from said terminal connected to said LAN in accordance with instructions from said terminal connected to said LAN, and sending said electronic money thus changed back to said terminal.

7. An electronic money managing device for mediating electronic money transactions employing an electronic money digital cash system between a terminal connected to a LAN and a terminal connected to a WAN, said WAN on which wide electronic money flows, and said LAN on which local electronic money usable only within an organization in which said LAN is operable and having a same currency as said wide electronic money flows, said managing device comprising:

a first means for receiving from said LAN said local electronic money encrypted by an encryption key of said network device whose destination terminal is a terminal connected to said WAN, decrypting said local electronic money by a decryption key of said network device to confirm the amount of said local electronic money, requesting issuance of said wide electronic money in the same amount as said local electronic money thus received to an issue server connected to said WAN, and upon receipt of said wide electronic money encrypted by said encryption key of said network device from said issue server, decrypting said wide electronic money by said decryption key of said network device to confirm the amount of said wide electronic money, erasing said local electronic money thus received, and encrypting said wide electronic money by an encryption key of said destination terminal of said local electronic money thus received to transmit said wide electronic money thus encrypted to said destination terminal of said local electronic money thus received through said WAN; and a second means for receiving from said WAN said wide electronic money encrypted by said encryption key of said network device whose destination terminal is a terminal connected to said LAN, decrypting said wide electronic money by said decryption key of said network device to confirm the amount of said wide electronic money, encrypting said wide electronic money thus decrypted by an encryption key of a receiving server connected to said WAN, transmitting said wide electronic money thus encrypted to said receiving server, and upon receipt of acknowledge from said receiving server as to receipt of said wide electronic money, generating said local electronic money in the same amount as said wide electronic money, and encrypting said local electronic money by an encryption key of said destination terminal of said wide electronic money thus received to transmit said local electronic money thus encrypted to said destination terminal of said wide electronic money thus received through said LAN.

8. An electronic money managing device according to claim 7, wherein:

said issue server and said receiving server is a server of a bank having an account of said organization in which said LAN is operable;

said issue server subtracts the same amount of money as said wide electronic money transmitted to said network device from said account of said organization; and said receiving server adds the same amount of money as said wide electronic money received from said network device to said account of said organization.

9. An electronic money managing device according to claim 7, further comprising:

history recording means for recording histories as to erasing of said local electronic money and transmission of said wide electronic money carried by said first means, and histories as to reception of said wide electronic money and generation of said local electronic money carried by said second means.

10. An electronic money management device according to claim 7, wherein:

if the amount of said local electronic money received from said LAN whose destination terminal is the terminal connected to said WAN exceeds a predetermined amount allocated to a member of the terminal connected to said LAN, said first means sends the received local electronic money back to the terminal connected to said LAN which was a transmitting origin of said local electronic money without making the request for issuance of said wide electronic money to said issue server connected to said WAN.

11. An electronic money managing device according to claim 10, wherein:

when the amount of said local electronic money received from the LAN whose destination terminal is the terminal connected to said WAN exceeds a predetermined amount allocated to a member of the terminal connected to said LAN, if said local electronic money has a message that the member of the terminal connected to said LAN and being the transmitting origin of said local electronic money is allowed to transmit such an amount exceeding said predetermined amount allocated, said first means makes the request for issuance of said wide electronic money to said issue server connected to said WAN, then executes the additional first means procedures.

12. An electronic money managing device according to claim 7, further comprising:

changing means for changing a combination of units comprising said local electronic money transmitted from said terminal connected to said LAN in accordance with instructions from said terminal connected to said LAN, and sending said electronic money thus changed back to said terminal.

13. An information recording medium storing therein an electronic money managing program for mediating electronic money transactions employing an electronic money digital cash system between a terminal connected to a LAN and a terminal connected to a WAN, said WAN on which wide electronic money flows, and said LAN on which local electronic money usable only within an organization in which said LAN is operable and having the same currency as said wide electronic money flows, said electronic money managing program implementing the following means in an information processing device connected to said LAN and said WAN:

a first means for receiving from said LAN said local electronic money encrypted by an encryption key of said network device whose destination terminal is a terminal connected to said WAN, decrypting said local electronic money by a decryption key of said network device to confirm the amount of said local electronic money, requesting issuance of said wide electronic money in the same amount as said local electronic money thus received to an issue server connected to said WAN, and upon receipt of said wide electronic money encrypted by said encryption key of said network device from said issue server, decrypting said wide electronic money by said decryption key of said network device to confirm the amount of said wide electronic money, erasing said local electronic money thus received, and encrypting said wide electronic money by an encryption key of said destination terminal of said local electronic money thus received to transmit said wide electronic money thus encrypted to said destination terminal of said local electronic money thus received through said WAN; and a second means for receiving from said WAN said wide electronic money encrypted by said encryption key of said network device whose destination terminal is a terminal connected to said LAN, decrypting said wide electronic money by said decryption key of said network device to confirm the amount of said wide electronic money, encrypting said wide electronic money thus decrypted by an encryption key of a receiving server connected to said WAN, transmitting said wide electronic money thus encrypted to said receiving server, and upon receipt of acknowledge from said receiving server as to receipt of said wide electronic money, generating said local electronic money in the same amount as said wide electronic money, and encrypting said local electronic money by an encryption key of said destination terminal of said wide electronic money thus received to transmit said local electronic money thus encrypted to said destination terminal of said wide electronic money thus received through said LAN.

* * * * *

UNITED STATES PATENT AND TRADEMARK OFFICE
CERTIFICATE OF CORRECTION

PATENT NO. : 6,487,542 B2
DATED : November 26, 2002
INVENTOR(S) : Ebata et al.

It is certified that error appears in the above-identified patent and that said Letters Patent is hereby corrected as shown below:

<u>Title page, Item [54] and Column 1, lines 1-4,</u>
Title should read:
-- METHOD AND APPARATUS FOR MANAGING ELECTRONIC MONEY AND STORAGE MEDIUM FOR STORING AN ELECTRONIC MONEY MANAGEMENT PROGRAM --

<u>Title page,</u>
Item [*] Notice, should read:
-- This patent issued on a continued prosecution application filed under 37 CFR §1.53(d), and is subject to the twenty year patent term provisions of 35 USC §154(a)(2).

Subject to any disclaimer, the term of this patent is extended or adjusted under 35 USC 154(b) by 0 days. --

Signed and Sealed this

Thirtieth Day of December, 2003

JAMES E. ROGAN
*Director of the United States Patent and Trademark Office*